US006971622B2

(12) United States Patent
Ziegler et al.

(10) Patent No.: US 6,971,622 B2
(45) Date of Patent: Dec. 6, 2005

(54) SUPPORTING DEVICE FOR A PORTABLE DEVICE

(75) Inventors: Jochen Ziegler, Stuttgart (DE); Ulf Walter, Schoenaich (DE); Dagmar Stolpmann, Bad Teinach (DE); Alf Clement, Aidlingen (DE)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 10/071,994

(22) Filed: Feb. 8, 2002

(65) Prior Publication Data

US 2002/0130243 A1    Sep. 19, 2002

(30) Foreign Application Priority Data

Feb. 15, 2001  (DE) ............................... 101 07 041

(51) Int. Cl.[7] .............................................. A47G 1/24
(52) U.S. Cl. ...................... 248/454; 248/455; 248/456
(58) Field of Search ............................. 248/176.3, 371, 248/415, 918, 460, 461, 462, 463, 454–457; 361/681, 682

(56) References Cited

U.S. PATENT DOCUMENTS

| | | | | |
|---|---|---|---|---|
| 3,562,796 A | * | 2/1971 | Jacobson | 248/456 |
| 4,196,674 A | * | 4/1980 | Van Laarhoven | 108/4 |
| 4,618,119 A | * | 10/1986 | Powell | 248/456 |
| 5,290,003 A | * | 3/1994 | Reyes | 248/461 |
| 5,366,197 A | * | 11/1994 | Westland | 248/456 |
| 5,451,025 A | * | 9/1995 | Hames | 248/456 |
| 5,797,578 A | * | 8/1998 | Graffeo et al. | 248/453 |
| 6,098,952 A | * | 8/2000 | Tonn | 248/688 |
| 6,113,052 A | * | 9/2000 | Gentile et al. | 248/456 |
| 6,216,377 B1 | * | 4/2001 | Painsith | 40/750 |
| 6,264,160 B1 | * | 7/2001 | Wells | 248/453 |

FOREIGN PATENT DOCUMENTS

JP          09219591 A      8/1997

* cited by examiner

Primary Examiner—Ramon O. Ramirez
Assistant Examiner—Steven Marsh
(74) Attorney, Agent, or Firm—Ohlandt, Greeley, Ruggiero & Perle, L.L.P.

(57) ABSTRACT

A supporting device for a portable device to measure and/or test components of electrical and/or optical networks includes a supporting plate, which is built in, or may be attached to, the equipment; a supporting frame, which may stand at one end on the sub-surface and may be adjustably filled at the other end to a sliding guide arranged on at least one supporting frame; and at least one lever, which at one end may be swivel mounted on a supporting frame between both ends around a first swivel axis that essentially runs parallel to the support surface, and may be swivel mounted at the other end onto a supporting plate under the sliding guide around a second swivel axis running parallel to the first swivel axis. This is where, on the sliding edge adjacent to the equipment side of the supporting plate, the sliding guide has at least one locking recess, into which the supporting frame end leading to the sliding guide tightly fits in order to support the supporting plate.

16 Claims, 7 Drawing Sheets

SUPPORTING DEVICE FOR A PORTABLE DEVICE

BACKGROUND OF THE INVENTION

The present invention concerns a supporting device for a portable device, more particularly a device mainly to measure and/or test components of electrical and/or optical systems or networks.

Such measuring or testing equipment will be used to characterize, or to test and measure, the performance or function of an electrical or optical component, for example the wiring or a component of an optical/electrical network, i.e. a data network with optical and/or electrical data transmission. For such testing and measurement, the device can be placed on a surface, for example the floor, a tabletop, shelving, or the like.

Existing supporting devices of this kind are constructed from a basic wire frame that is swivel-mounted on the back of the respective equipment. The adjustment range and ease of use are relatively limited. Another supporting device exists under JP-A-09219591.

SUMMARY OF THE INVENTION

The problem of the present invention is to find a better supporting device. This problem will be solved by the characteristics of the independent claims. Advantageous embodiments are stated in the dependent claims.

The invention is based on the concept of laying a supporting frame over a lever onto a supporting plate that is connected, or connectable, to the equipment, and also of adjustably mounting one end of the supporting frame onto a sliding guide that is arranged on the supporting plate. The sliding guide gives basic adjustability to the supporting frame. The sliding guide is designed with locking recesses, in which the ends of the supporting frame, which lead into the sliding guide, can fit in tightly in various positions. Angle preferences for the supporting device and the equipment can be defined through the locking recesses, allowing relative ease of handling of the supporting device.

Through one selected embodiment, the sliding guide and the kinematics formed between the supporting plate, supporting frame and lever can be selected such that a maximal setting can be set for the supporting frame, in which the latter essentially lies on its inside on the support surface; in which the supporting plate lies on the outside of the supporting frame with the support area arranged over the sliding guide; and in which the supporting frame end stemming from the sliding guide protrudes insignificantly, or not at all, over the support area. In this maximal setting, a minimal angle of the supporting device and the equipment relative to the surface can be set. A particular advantage of this is that the supporting frame end stemming from the sliding guide protrudes very little, or not at all, over the support area, thus leaving relatively little space sufficient for the proper placement of the equipment and supporting device. Conventional supporting frames, which are directly swivel-mounted on the rear side of the equipment, jut in this maximal setting far above the outer contours of the equipment, thus requiring a relatively large storage area.

Through another embodiment, the sliding guide and the kinematics formed between the supporting plate, supporting frame and lever can be selected such that a setting can be made for when the supporting frame is not being used, in which the supporting frame fits with its inner side into the reverse side of the supporting plate, which is joined to the supporting frame, and in which the lever runs essentially parallel to the inner side of the supporting frame and runs parallel to the rear side of the supporting plate between the supporting frame and the supporting plate. In this setting, the support device thus requires minimal space, hence improving the ease of handling when the equipment is out of use. A more compact structure is thus attained when the supporting frame contains a recess on its inner side for the lever when the supporting frame is not in use. Apart from this adept use of space, this embodiment also allows for the protection of the lever.

Through a further configuration, the supporting plate can have a recess on its rear side, in which the supporting frame can be stowed away when not in use. Through this configuration, the supporting frame is protected when not in use. In addition to this, this results in an extremely space saving, integrated, and more particularly level rear facade for the supporting device and the respective equipment.

In principal, the supporting device may be configured as an integral component of the respective equipment. However, the preferred embodiment is one in which the supporting device is separate from the equipment, whereby the supporting device can therefore be fixed to the equipment using an appropriate connector. Quick-connectors are preferable for this purpose. When configured as a separate component, the supporting device can be optionally attached to the equipment.

Particularly advantageous is an embodiment in which the supporting device is impact-proof and shock-resistant. Doing so gives the supporting device a protective function, thus prolonging the lifespan of the attached equipment.

BRIEF DESCRIPTION OF THE DRAWINGS

The following gives a further description of the invention with reference to the drawings; wherein the same reference marks refer to identical, functionally identical, or similar features. It is shown schematically in FIG. 1 a perspective view of equipment fitted with a supporting device according to the invention, FIG. 2 a perspective view of the supporting device, but with no attached equipment, FIGS. 3–7 cross-section side-angle views of the supporting device at various points.

DETAILED DESCRIPTION OF THE DRAWINGS

Figure 1:
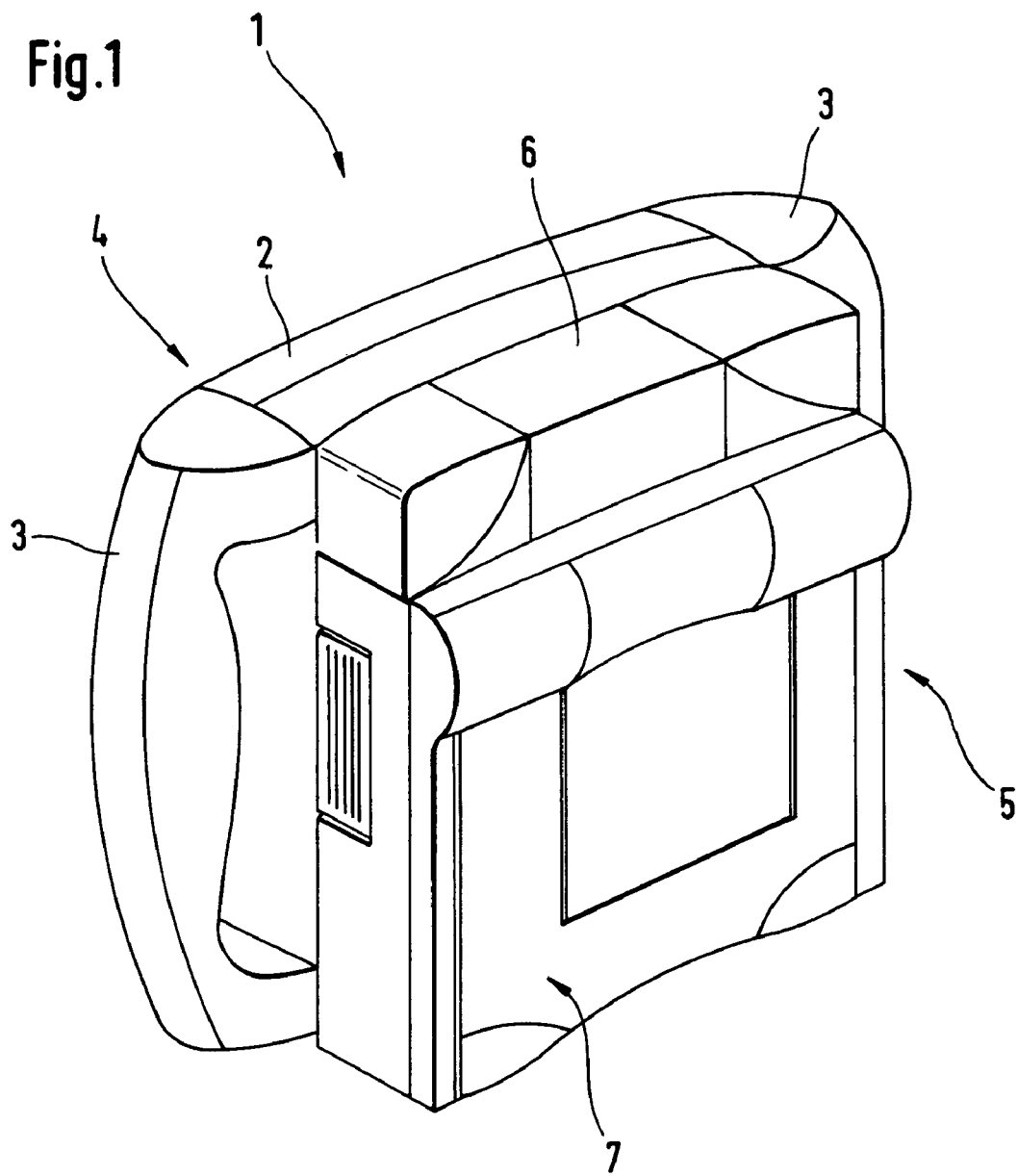

According to FIG. 1, the portable equipment 1 has a base module 2 which has handles 3 on either side and is also fitted in the usual manner with operating devices and at least one display device on the front side 4 furthest from the viewer. On the rear side 5 nearest to the viewer, the equipment 1 is fitted with a function module 6, which is built on or attached to the base module 2. Furthermore, on rear side 5 of the equipment 1 is the supporting device 7 according to the invention, which may be attached to the equipment 1 or to its function module 6. In this case, this means that the supporting device 7 is a separate component that may be attached to the equipment 1 or its function module 6 using a suitable connector, more particularly a quick-connector. Alternatively, an embodiment is possible in which the supporting device 7 forms an integral component of the equipment 1 or the function module 6.

Figure 2:
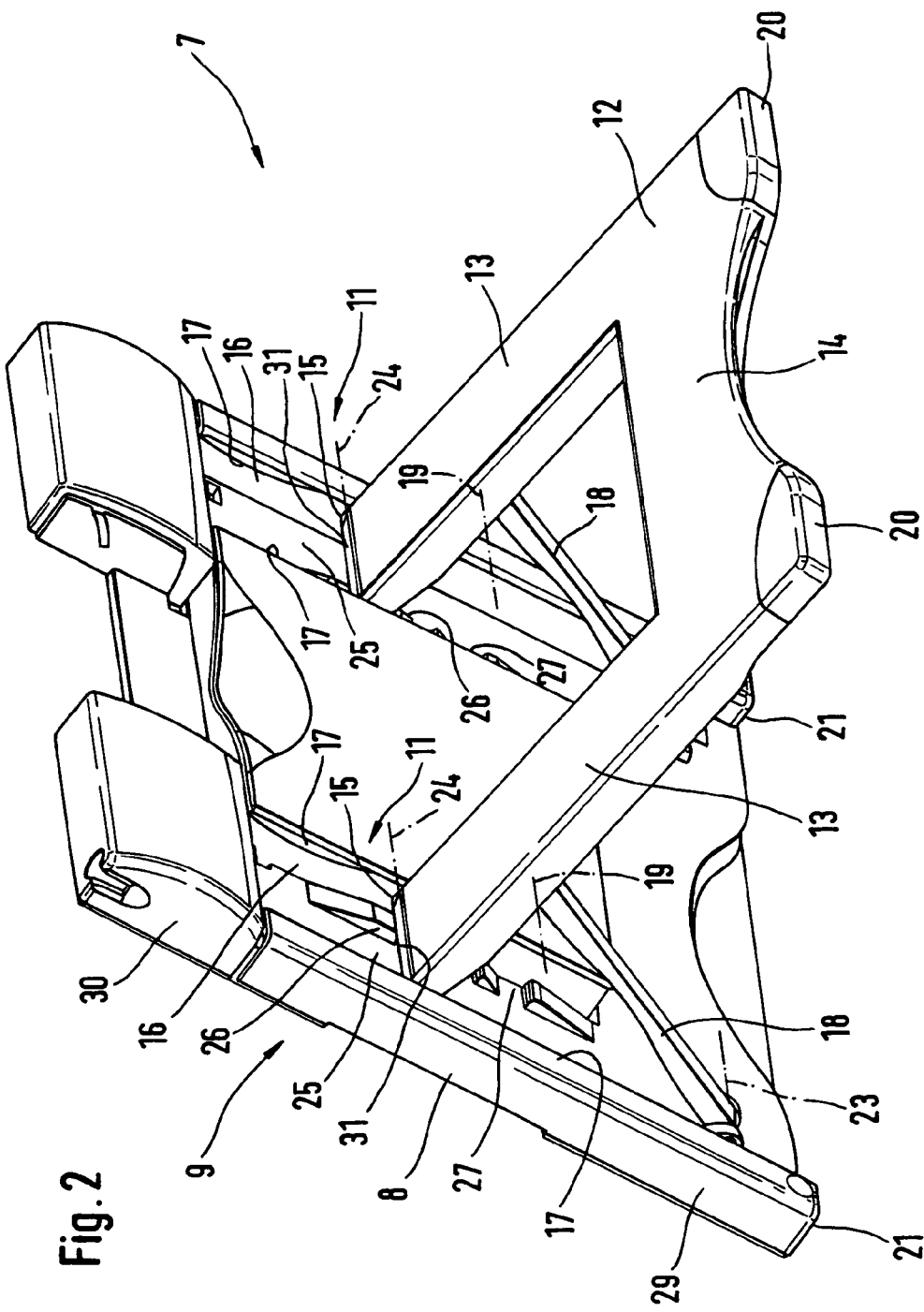

The equipment 1 or its function module 6 may comprise an electrical time domain reflectometer (TDR), or may be configured as such, with which an electrical cable, such as a co-axial transmission cable, telephone cable, or other supply such as piping, may be characterized or measured. The equipment 1 or its function module 6 may equally comprise an optical time domain reflectometer (OTDR), or may be configured as such, which may be used to characterize/measure, for example, the reduction in homogeneity, splice waste, interruptions, the length, or the like of an optical fiber. Furthermore, the equipment 1 or its function module 6 may comprise a wavelength division multiplexing (WDM) testing device, or may be configured as such, which can be used to test/measure wavelength division multiplexing signals. According to FIG. 2 the supporting device 7 has a supporting plate 8, which is built into the equipment 1 as an integral component or may be attached to the equipment 1 as a separate component. In this case, the supporting plate 8 has an appropriate connector, more particularly quick-connector, on the side 9 of the equipment 1, on the far side from the viewer. These connectors are marked as 10 in FIG. 3–7 and are designed in a hooked shape. The supporting plate 8 has two sliding guides 11 on its near side from the viewer in FIG. 2, which are arranged parallel to one another and each run from top to bottom along the supporting plate 8. The supporting device 7 also has a U-shaped supporting frame 12, the U-Shanks 13 of which may be adjustably fitted in the sliding guide 11 at the opposite ends 31 from their U-base 14. Sideways protruding pins 15 are also built onto these supporting frame ends 31 on both sides of each U-shank 13. These pins 15 attach to the guiding track 16 of the sliding guide 11. The pins 15 also reach behind the sliding edges 17 on the near side towards the viewer and the supporting frame 12.

For each U-shank 13, the supporting device 7 also has a lever 18, each of which may be swivel-mounted at one end on a supporting frame 12 or its U-shank 13 around the first swivel-axis 19. These (19) first swivel axes 19 are thus positioned between the ends of the supporting frame 12 and the U-shank 13. The preferred formation is one that is relatively near to the respective sliding guide 11. The sub-surface, on which is placed the end 20 of the supporting frame 12 leading from the supporting plate 8, as well as the lower end 21 of the supporting plate 8, is not shown in FIG. 2. In FIG. 3-7, this surface is marked as 22.

Although two sliding guides 11 are displayed in the embodiment shown here, other embodiments are also possible with only one, more particularly centrally arranged, sliding guide or with more than two sliding guides. The supporting frame 12 and the number of levers are thus adjusted accordingly.

Each lever 18 is swivel-mounted at the end opposite from its supporting frame 14 on the supporting plate 8 around a second swivel axis 23, which runs parallel to the first swivel axis 19. Second swivel axis 23 is thus arranged near the lower end 21 of the supporting plate 8 underneath its respective sliding guide 11.

The ends 31 of the supporting frames 12 and the U-Shanks 13 fitted in the sliding guides 11 may be mounted onto the third swivel axis 24, which runs parallel to the first swivel axis 19, and may also be adjustably fitted in the respective sliding guide 11 along the supporting plate 8 perpendicular to this swivel axis 24.

Each sliding guide 11 has a sliding edge 25, adjacent to the side of the supporting plate 8 nearest to the equipment 1, from which a slotted link outline 26 protrudes into the supporting frame 12. The slotted link outline 26 has several locking recesses 27, into which the supporting frame end 31 leading to the respective sliding guide 11 may be tightly fitted in order to support the supporting plate 8.

Figure 3:
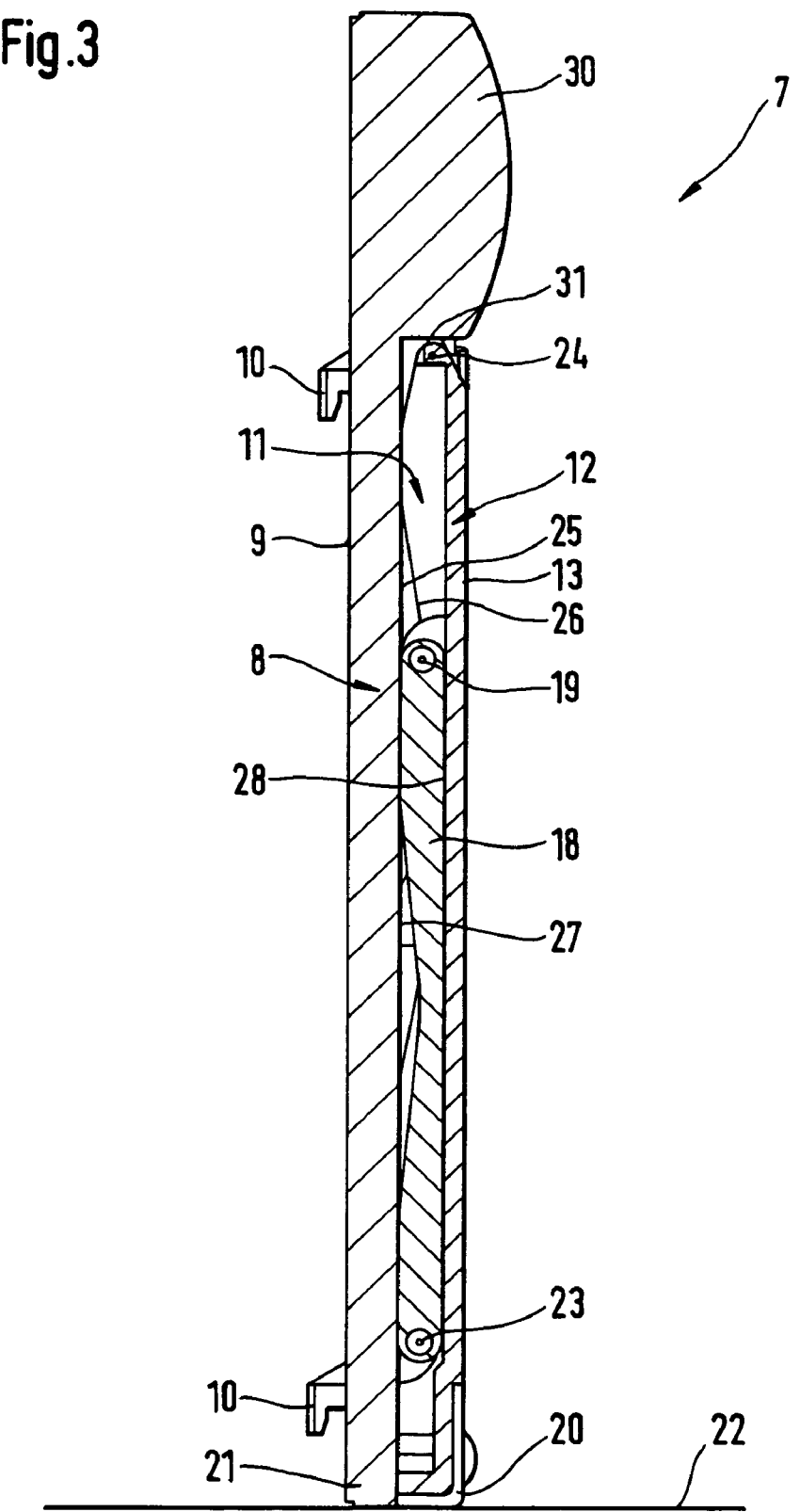

In FIGS. 1 and 3, the supporting frame 12 is changed to the setting for when it is out of use, in which the supporting frame 12 essentially runs parallel to the supporting plate 8. The levers 18 are configured such that they run parallel to the supporting plate 8 between the supporting plate 8 and the supporting frame 12 when not in use. The supporting frame 12 and its U-shanks 13 also have a recess 28 for each lever 18, into which the lever 18 extends when the supporting frame 12 is not in use. Furthermore, the supporting plate 8 has a U-shaped recess, into which the supporting frame 13 is stowed away when not in use. The side cheeks 29, as well as the upper support area 30 of the supporting plate 8, thus form a sideways mounting for the supporting frame 12, which securely locks into the mountings when not in use.

Figure 4:
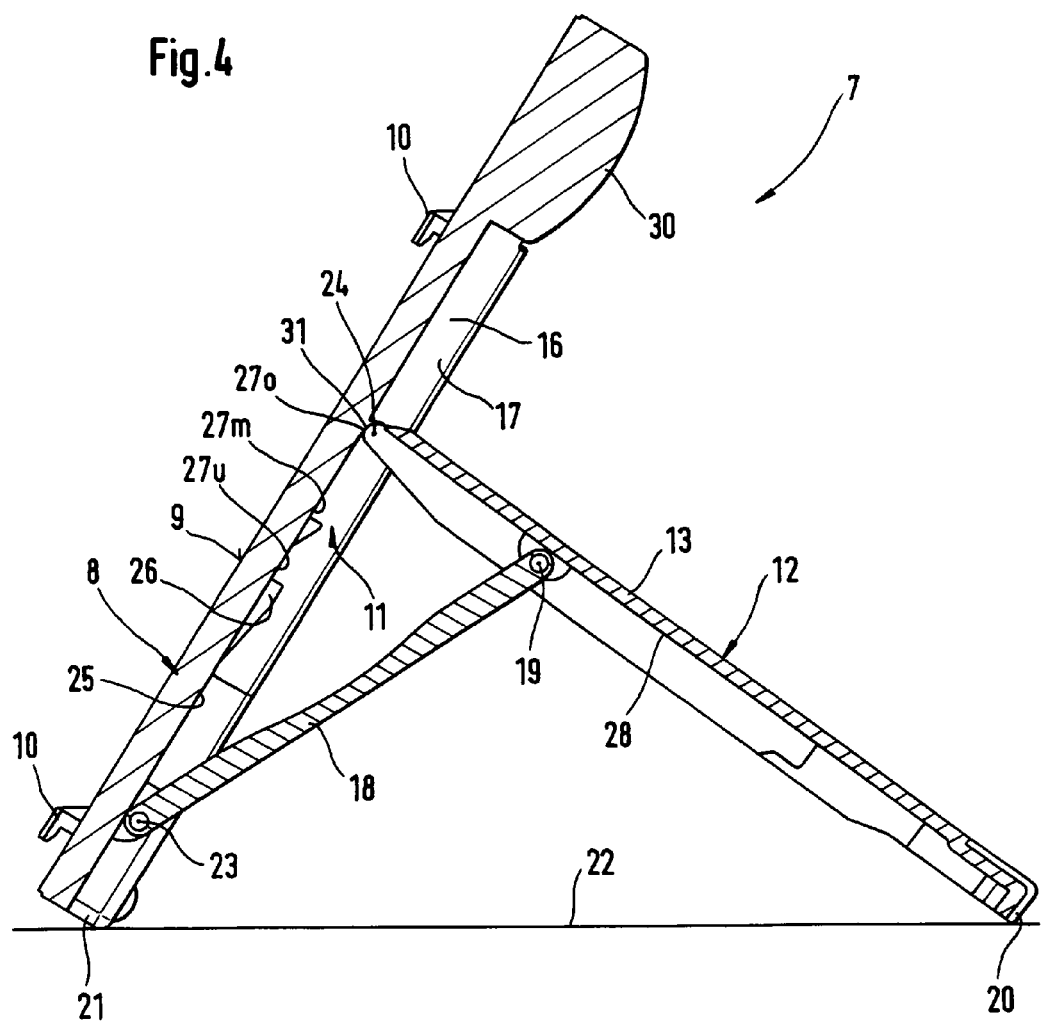

In FIG. 4, the supporting frame ends 31 leading into the sliding guide 11 plug into the above locking recess 27o, thus giving the first support position for the supporting device 7, through which the supporting plate 8, as well as the equipment 1 connected to it if applicable, is at an appropriate angle relative to the sub-surface 22.

Figure 5:
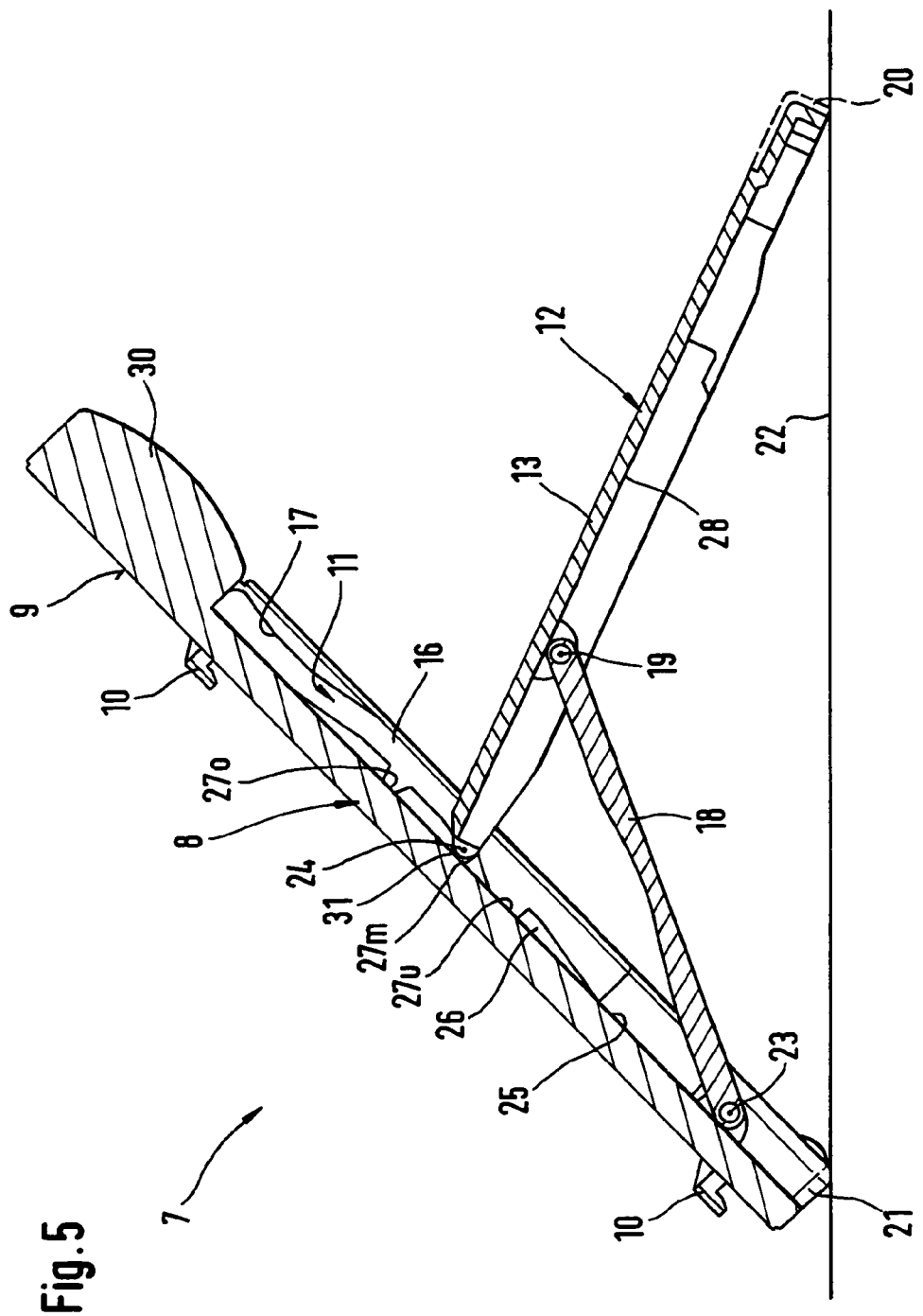

In a second support position as in FIG. 5, the supporting frame end 31 is tucked into a central locking recess 27m, whereby the supporting plate 8 is at a different angle relative to the surface 22.

Figure 6:
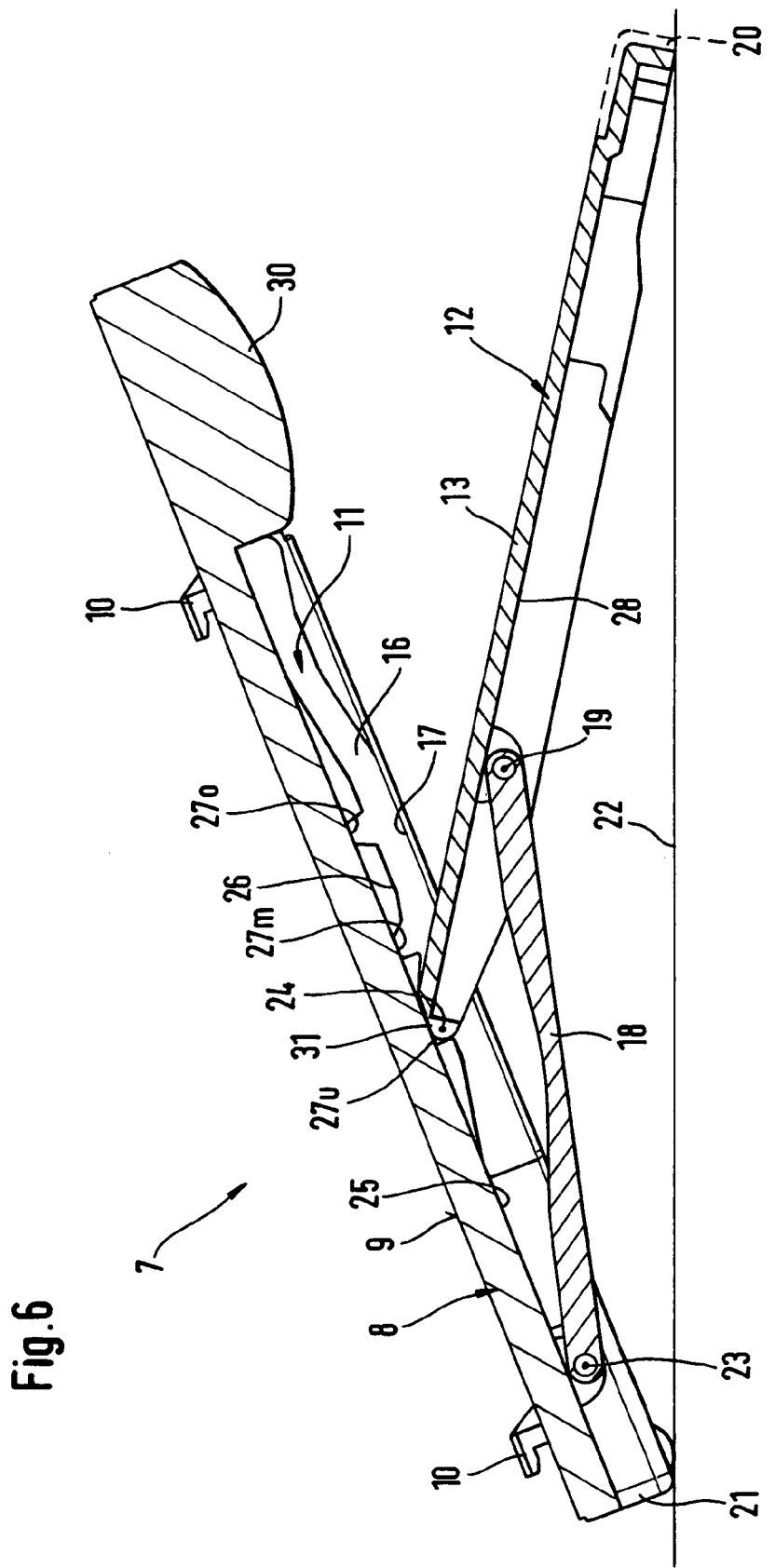

In the embodiment according to the invention, FIG. 6 shows that the sliding guide 11 also has a lower locking recess 27u, with which another angle may be set between the support surface 22 and the supporting plate 8 or the equipment 1 fixed to it. In FIG. 6, the supporting frame end 31 related to the sliding guide 11 is tucked into the lower locking recess 27u for this purpose.

Figure 7:
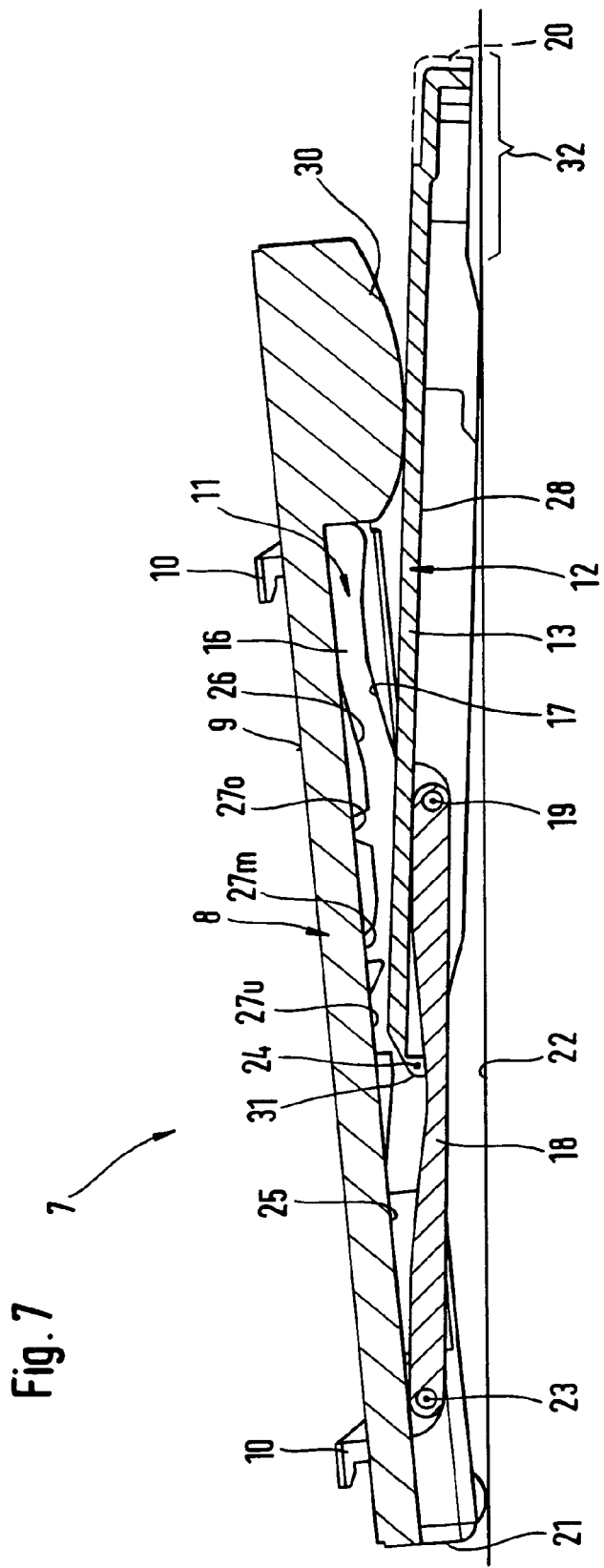

According to FIG. 7, the length of the lever 18, supporting frame 12, as well as the positioning of the bearing points or swivel axes 19 and 23 are coordinated in such a way that results in kinematics making it possible, in conjunction with the accordingly arranged sliding guide 11, to set a maximal setting for the supporting frame 12 as shown in FIG. 7. In this, the supporting frame 12 rests on the supporting surface 22 on its inner side. The supporting plate 8 rests on the outside of the supporting frame 12 with is support area 30 arranged above the sliding guide 11. With this, kinematics is selected such that the supporting frame end 20 at the opposite end from the sliding guide 11, with which the supporting frame 12 is supported in FIG. 3-6 on the surface 22, covers a relatively small sideways range 32 (indicated by a brace) over the support area 30 of the supporting plate 8. This means that even with the maximum setting for the supporting frame 12, the necessary storage space for the supporting device 7 is only slightly larger than the outer contours of the entire supporting device 7. With a configuration such as in FIG. 1, this means that even in this maximum setting, the necessary storage space remains less than the outer contours of the casing 2 of the equipment 1. The supporting device 7 therefore requires no additional storage space in settings as in FIG. 4-7.

In the supporting device 7 according to the invention, the levers 18 are only used to pull, such that they only have relatively small width. The power transmission is thus made by the respective U-Shank 13 directly to the supporting plate 8 with no inserted bearings. The U-Shank 13 and the entire supporting frame 12, on the other hand, have a pressure-resistant and contorsion-resistant profile. By and large however, the supporting frame 12 and the levers 18 can be configured to be relatively flat, meaning that the width and height of these elements, and thus the entire supporting device 7, are clearer larger than their depth. The supporting device 7 according to the invention thus increases only insignificantly the spatial volume for the casing 1.

Through the selected configuration, the supporting device 7 can be made entirely of synthetic materials, and is thus relatively inexpensive to manufacture. Furthermore, the supporting device 7 or its components are built to be impact-proof and/or shock-absorbent in order to also form protection for the equipment 1.

What is claimed is:

1. Supporting device for supporting a portable device on a surface, comprising:
    a supporting plate on which the portable device is arranged and having a first end that can be placed on said surface;
    a supporting frame having a substantially planar arrangement with (a) a first end that can be placed on said surface, and (b) a second end in a sliding guide located at said supporting plate; and
    a lever having (a) a first end pivotally mounted at said supporting frame between said first end and said second end of said supporting frame, around a first swivel axis running parallel to said surface, and (b) a second end pivotally mounted on said supporting plate below said sliding guide around a second swivel axis running parallel to said first swivel axis,
    wherein said sliding guide has a locking recess along an edge bordering said supporting plate,
    wherein said second end of said supporting frame is movable along said sliding guide for engaging said locking recess at one or more distances between said second end of said supporting frame and said second end of said lever so that said supporting plate is supported at one or more angles of elevation, and
    wherein, when said first ends of said supporting plate and said supporting frame are placed on a surface with said supporting plate elevated, a substantially triangular cross-section is outlined by said surface, said supporting frame and said supporting plate, said triangular cross section being spanned by said lever from said supporting plate to said supporting frame.

2. Supporting device according to claim 1, wherein said second end of said supporting frame is pivotally mounted around a third swivel axis that runs parallel to said first swivel axis and is adjustably arranged perpendicularly to said first swivel axis, along said supporting plate.

3. Supporting device according to claim 1,
    wherein said supporting frame can be adjusted to a maximum position in which said supporting frame rests with a first side of said supporting frame on said surface, and
    wherein said supporting plate, with a supporting area above said sliding guide, rests on a second side of said supporting frame.

4. Supporting device according to claim 1, wherein said second end of said lever is arranged closer to said second end of said supporting frame than to said first end of said supporting frame.

5. Supporting device according to claim 1,
    wherein said supporting frame can be adjusted to a "not in use" position in which said supporting frame rests with a first side of said supporting frame on a side of said supporting plate facing said supporting frame, and
    wherein said lever runs mostly parallel to said first side of said supporting frame and mostly parallel to said side of said supporting plate, between said supporting plate and said supporting frame.

6. Supporting device according to claim 5, wherein said supporting frame has a side with a recess into which said lever extends during said "not in use" position.

7. Supporting device according to claim 1, wherein said supporting plate has a side with a recess into which said supporting frame is arranged during said "not in use" position.

8. Supporting device according to claim 1,
    wherein said sliding guide is a first sliding guide and said lever is a first lever, and said supporting device further comprises a second sliding guide located at said supporting plate and a second lever,
    wherein said supporting frame is U-shaped with a first extension and a second extension,
    wherein said first lever is pivotally connected to said first extension, and said first extension is pivotally connected to said first sliding guide, and
    wherein said second lever is pivotally connected to said second extension, and said second extension is pivotally connected to said second sliding guide.

9. Supporting device according to claim 1, wherein said supporting device is an integral part of said portable device.

10. Supporting device according to claim 1, wherein said supporting device is a separate component of said portable device.

11. Supporting device according to claim 10, further comprising quick connectors to secure said supporting device to said portable device.

12. Supporting device according to claim 1, wherein said supporting device is impact resistant and/or impact absorbing.

13. Supporting device according to claim 1, wherein said supporting device is made of plastic.

14. Supporting device according to claim 1, wherein said portable device is for measuring or testing components of electrical circuits or optical networks.

15. Supporting device according to claim 1, wherein said portable device includes a time domain reflectometer (TDR).

16. Supporting device according to claim 1, wherein said portable device includes an optical time domain reflectometer (OTDR).

* * * * *